(12) United States Patent
Dearth et al.

(10) Patent No.: US 9,639,495 B2
(45) Date of Patent: May 2, 2017

(54) INTEGRATED CONTROLLER FOR TRAINING MEMORY PHYSICAL LAYER INTERFACE

(71) Applicant: Advanced Micro Devices, Inc., Sunnyvale, CA (US)

(72) Inventors: Glenn A. Dearth, Groton, MA (US); Gerry Talbot, Concord, MA (US); Anwar Kashem, Cambridge, MA (US); Edoardo Prete, Arlington, MA (US); Brian Amick, Bedford, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 53 days.

(21) Appl. No.: 14/318,114

(22) Filed: Jun. 27, 2014

(65) Prior Publication Data

US 2015/0378603 A1 Dec. 31, 2015

(51) Int. Cl.
*G06F 12/00* (2006.01)
*G06F 13/40* (2006.01)

(52) U.S. Cl.
CPC ................ *G06F 13/4072* (2013.01)

(58) Field of Classification Search
CPC .. G06F 12/00; G06F 13/1689; G06F 13/4072; G06F 13/4086; G06F 1/3275; Y02B 60/1228
See application file for complete search history.

(56) References Cited

U.S. PATENT DOCUMENTS

| | | | |
|---|---|---|---|
| 2010/0275037 A1 | 10/2010 | Lee et al. | |
| 2012/0066445 A1* | 3/2012 | Searles | G06F 1/3275 |
| | | | 711/106 |
| 2012/0126868 A1 | 5/2012 | Machnicki et al. | |
| 2012/0307577 A1 | 12/2012 | Sriadibhatla et al. | |
| 2013/0318285 A1 | 11/2013 | Pignatelli | |

(Continued)

FOREIGN PATENT DOCUMENTS

| | | |
|---|---|---|
| EP | 2616946 | 6/2014 |
| KR | 1020120077315 | 1/2014 |

OTHER PUBLICATIONS

International Search Report and Written Opinion correlating to PCT/US2015/037158 dated Sep. 15, 2015, 9 pages.

(Continued)

*Primary Examiner* — Yong Choe (57) ABSTRACT

A controller integrated in a memory physical layer interface (PHY) can be used to control training used to configure the memory PHY for communication with an associated external memory such as a dynamic random access memory (DRAM), thereby removing the need to provide training sequences over a data pipeline between a BIOS and the memory PHY. For example, a controller integrated in the memory PHY can control read training and write training of the memory PHY for communication with the external memory based on a training algorithm. The training algorithm may be a seedless training algorithm that converges on a solution for a timing delay and a voltage offset between the memory PHY and the external memory without receiving, from a basic input/output system (BIOS), seed information that characterizes a signal path traversed by training sequences or commands generated by the training algorithm.

19 Claims, 4 Drawing Sheets

(56) References Cited

U.S. PATENT DOCUMENTS

| | | |
|---|---|---|
| 2014/0006675 A1 | 1/2014 | Meir |
| 2014/0043918 A1 | 2/2014 | Ellis et al. |
| 2014/0079399 A1* | 3/2014 | Goswami ........... H04Q 11/0067 398/76 |
| 2014/0114887 A1 | 4/2014 | Iyer et al. |

OTHER PUBLICATIONS

U.S. Appl. No. 14/318,065, filed Jun. 27, 2014, entitled "Memory Physical Layer Interface Logic for Generating Dynamic Random Access Memory (DRAM) Commands With Programmable Delays".

International Search Report correlating to PCT/US2015/037172 dated Sep. 21, 2015, 9 pages.

Written Opinion correlating to PCT/US2015/037172 dated Sep. 21, 2015, 7 pages.

* cited by examiner

INTEGRATED CONTROLLER FOR TRAINING MEMORY PHYSICAL LAYER INTERFACE

CROSS REFERENCE TO RELATED APPLICATIONS

This application is related to U.S. patent application Ser. No. 14/318,065, filed on, Jun. 27, 2014, which is incorporated herein by reference in its entirety.

BACKGROUND

Field of the Disclosure

This application relates generally to processing systems and, more particularly, to a memory physical layer interface in a processing system.

Description of the Related Art

Processing systems such as systems-on-a-chip (SOCs) use memory to store data or instructions for later use. For example, an SOC may include processing units such as central processing units (CPUs), graphics processing units (GPUs), and accelerated processing units (APUs) can read instructions or data from memory, perform operations using the instructions or data, and then write the results back into the memory. Processing systems may include a memory physical layer interface for controlling access to a memory module such as dynamic random access memory (DRAM) that can be used to store information so that the stored information can be accessed by the processing units during operation of the processing system. The memory physical layer interface in a processing system is conventionally referred to as a "memory PHY." A memory controller is typically used to control operation of the memory PHY.

The memory PHY typically is trained using sequences exchanged over an interface between the memory PHY and the DRAM before data can be accurately read from the DRAM or written to the DRAM. The interface training procedure may include a global interface initialization mechanism to perform a relatively coarse-grained synchronization of command issuing and data sample timing at the interface endpoints for reading and writing. The training sequence for the global synchronization may be, for example, constructed with a continuous stream of DRAM commands, punctuated in a periodic fashion with a command gap that may be referred to as a "bubble." This sequence creates a series of time/event markers inside the continuous stream that can be used to frame or synchronize coarse/global interface timing. A finer-grained per-signal training procedure may then be used to find the optimal timing and voltage offset for sampling the data signal. The training sequence for the per-signal training procedure may include a random mix of "1s" and "0s" that are read from and/or written to the DRAM. Signals returned from the DRAM in response to the training sequence are used to determine the contour of a "data eye," which is a plot that shows the rising edge, the falling edge, and the high/low voltages that represent a value of a data signal as a function of time and voltage.

Conventional training procedures are initiated by BIOS code running on a processor in the processing system. However, the BIOS is typically logically or physically remote from the memory PHY. For example, the BIOS and the memory PHY may be separated by a data pipelines, memory caches, and buffers. These intervening interfaces and subsystem blocks may distort or alter training control and data sequences transmitted from the BIOS, e.g., additional bubbles may be introduced into the training sequence making it more difficult to find efficient training algorithms. Consequently, the BIOS typically incorporates complex training sequence seeding and data post-processing schemes into the training code. Both approaches have significant drawbacks. For example, the additional time required to move, mine, and operate on the data during post-processing increases the overall time required to perform training If the total training time budget is fixed, then the additional time spent in post-processing means that time must be saved elsewhere to keep the overall training time within budget. Time may be saved by running shorter patterns, which may result in a larger training error. For another example, training sequence seeding is used to start the training from a system state where the pipeline issues described above that could prevent the algorithm from converging are avoided, but finding the appropriate seed values to correctly define the initial system state requires extensive system and platform characterization. The seed values may include information that characterizes the data pipeline, the memory PHY, or other logical or physical entities along the path from the BIOS, through the memory PHY to the DRAM, and back to the BIOS. Each of the seed values must be characterized in the lab for each processing system or implementation of DRAM. Consequently, the quantity and variety of seed information that must be generated is expanding rapidly as the number and diversity of processing systems and associated memory devices increases, which may increase the BIOS code size and make the BIOS more difficult to maintain.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

As discussed herein, a data pipeline between a BIOS and a memory PHY can make it more difficult to find efficient training algorithms that can be implemented in the BIOS to control timing of the training sequences that are provided to the DRAM. Furthermore, the changes in the training sequences may make it more difficult for the training algorithm in the BIOS to process the signals returned by the DRAM. Moving the training algorithm from the BIOS to the memory PHY can reduce pressures on system timing budgets that may be introduced by post-processing that is performed to compensate for the distortions in training sequences caused by a data pipeline, thereby improving control of the timing of the timing sequences and, in some embodiments, reducing or eliminating the need to seed the training algorithm. Implementing the training algorithm in the memory PHY may also simplify the design of the hardware used to implement the memory PHY and allow engineers to create more effective training algorithms that are tuned to the processing system. Implementing embodiments of the training algorithm in hardware (e.g., as part of the hardware used to implement the memory PHY) may also allow testing to be performed "at speed," which means that commands and training sequences can be transmitted at the maximum rate of the DRAM interface.

In some embodiments, an integrated controller such as a microcontroller within the memory PHY can be used to control the training algorithm used to configure the memory PHY for communication with an associated DRAM, thereby removing the need to provide training sequences over a data pipeline between the BIOS and the memory PHY. The training algorithm can therefore be implemented as a seedless training algorithm because it is not necessary to account for distortions or alterations of the training sequences as they are conveyed along the data pipeline. As used herein, "seed" information refers to information that characterizes the signal path traversed by training sequences or commands generated by the training algorithm. The training algorithm uses the seed information to establish an initial system state such that the training algorithm can converge on a synchronization solution, e.g., so that post-processing of the returned signals can converge on a solution for the phase differences (or timing delays) and voltage offsets between the memory PHY and the associated DRAM. A "seeded" training algorithm therefore requires seed information for convergence. In contrast, a "seedless" training algorithm can converge on a synchronization solution without establishing the initial state using seed information. However, in some embodiments, the BIOS may still provide configuration information that can be used by a seedless training algorithm such as information identifying the configuration of the DRAM, although receiving this information from the BIOS may not be necessary to insure convergence.

In some embodiments, the microcontroller is coupled to a first training engine that generates programmable sequences of commands that are delivered to the DRAM, a second training engine that generates the training sequences, and a third training engine that compares traffic received from the DRAM to its expected value based on the training sequences provided to the DRAM. For example, the third training engine may correlate one or more transmitted training sequences with received signals to determine a timing delay between the transmitted and received sequences. The third training engine may also adjust timing or voltage offset parameters used by the memory PHY. The first training engine may sequence execution of tasks performed by the second and third training engines.

Figure 1:
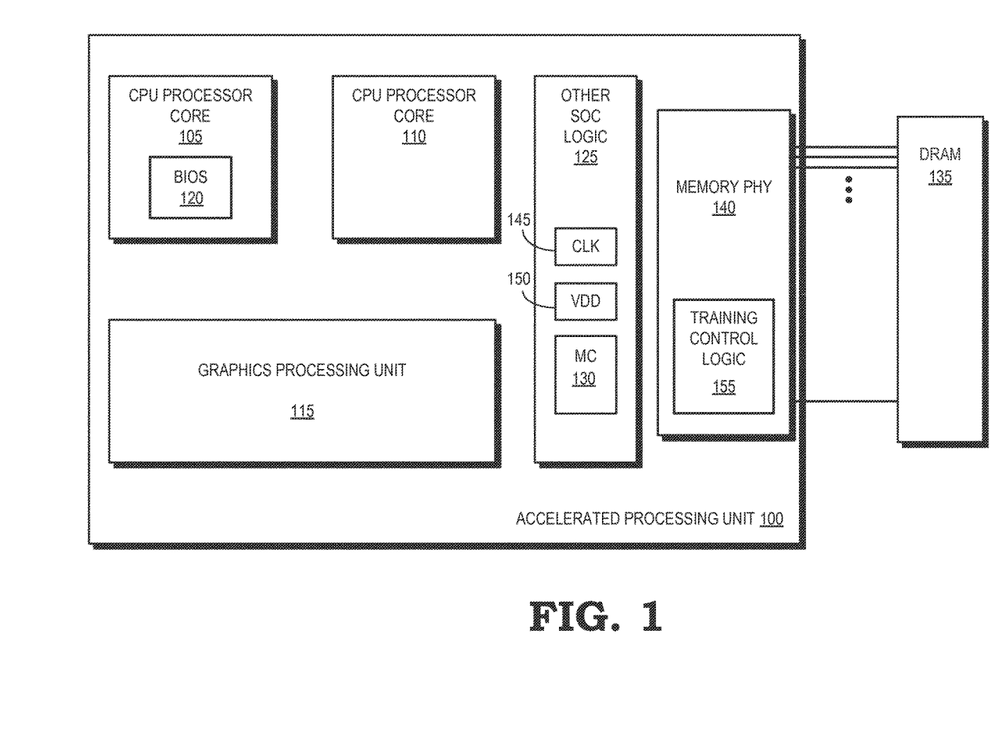
FIG. 1 is a block diagram of an accelerated processing unit (APU) that includes one or more central processing unit (CPU) processor cores and a graphics processing unit (GPU) according to some embodiments.

FIG. 1 is a block diagram of an accelerated processing unit (APU) 100 that includes one or more central processing unit (CPU) processor cores 105, 110 and a graphics processing unit (GPU) 115 according to some embodiments. The APU 100 may be implemented as a system-on-a-chip (SOC). The CPU processor cores 105, 110 can execute instructions independently, concurrently, or in parallel. Although the APU 100 shown in FIG. 1 includes two CPU processor cores 105, 110, persons of ordinary skill in the art having benefit of the present disclosure should appreciate that the number of processor cores in the APU 100 is a matter of design choice. Some embodiments of the APU 100 may include more or fewer than the two CPU processor cores 105, 110 shown in FIG. 1. The GPU 115 is used for creating visual images intended for output to a display. Some embodiments of the GPU 115 may also include multiple processing cores (not shown).

The CPU processor core 105 includes a basic input/output system (BIOS) 120 that may be implemented in hardware, firmware, software, or a combination thereof. Some embodiments of the BIOS 120 are used to initialize or test components of the APU 100, e.g., in response to a system including the APU 100 being powered on or booted up. The BIOS 120 may also be used to load an operating system. Instructions or commands generated by the BIOS 120 may be conveyed to other locations in the APU 100 using one or more data pipelines (not shown in FIG. 1). The BIOS 120 may alternatively be implemented in the CPU processor core 110 or other locations within the APU 100.

The APU 100 shown in FIG. 1 also includes other SOC logic 125. Some embodiments of the other SOC logic 125 may include a DMA engine (not shown) for generating addresses and initiating memory read or write cycles, for performing memory-to-memory data transfer, or for transferring data between the CPU processor cores 105, 110 or the GPU 115. The other SOC logic 125 may also include routing logic, coherency logic, or logic to implement other functionality. Some embodiments of the other SOC logic 125 include a memory controller (MC) 130 to coordinate the flow of data between the APU 100 and other memory such as an external dynamic random access memory (DRAM) 135. The memory controller 130 includes logic used to control reading information from the external memory and writing information to the external memory. The memory controller 130 may also include refresh logic that is used to periodically re-write information to the DRAM so that information in the memory cells of the DRAM is retained. Some embodiments of the DRAM may be double data rate (DDR) DRAM, in which case the memory controller 130 may be capable of transferring data to and from the DRAM on both the rising and falling edges of a memory clock.

The memory controller 130 may control the operation of other memory modules such as the DRAM 135 using signals transmitted via a memory physical layer interface 140, which may be referred to as a memory PHY 140. The memory PHY 140 includes the circuitry used to drive signals that govern operation of the other memory modules that may be coupled to the APU 100. For example, the memory PHY 140 may provide signals that control reading, writing, refreshing, or erasing portions of a memory module such as the DRAM 135. The memory PHY 140 may be able to operate at different operating points, which may be determined by an operating frequency and/or operating voltage of the memory PHY 140. For example, the other SOC logic 125 may include a clock 145 provides a clock signal to govern synchronization in the memory PHY 140 and/or the memory controller 130 and a reference voltage (VDD) 150 that governs the voltage used by the memory PHY 140 and/or the memory controller 130.

The memory PHY 140 should be trained in order to improve the read or write performance during communication between the memory PHY 140 and the DRAM 135. The memory PHY 140 therefore includes integrated training control logic 155 that is used to generate training sequences or commands, transmit the training sequences or commands to the DRAM 135, receive signals generated by the DRAM 135 in response to the transmitting sequences or commands, and adjust the read/write parameters of the memory PHY 140 based on the responses from the DRAM 135.

Integrating the training control logic 155 into the memory PHY 140 has a number of advantages over the conventional practice of training the memory PHY 140 using algorithms implemented in the BIOS 120. Post-processing and/or seeding of the training algorithm used by the training control logic 155 may be reduced or eliminated by removing the need to transmit training sequences over a data pipeline between the BIOS 120 and the memory PHY 140. Furthermore, incorporating the training control logic 155 that supports training of the memory PHY 140 into the memory PHY 140 is significantly less complicated than designing a BIOS 120 to support training of the memory PHY 140. For example, in order to design a BIOS training algorithm, a plethora of complex memory PHY initialization and control details must be exported to engineers responsible for designing the BIOS training algorithm. For example, the memory PHY 140 may include hundreds of registers (not shown in FIG. 1 in the interest of clarity) that are used to define timing, locking frequencies, etc., and each of these registers needs to be initialized and accessed in the correct sequence. The BIOS engineers may be unfamiliar with operation of the memory PHY 140, or at least significantly less familiar with the operation of the memory PHY 140 than engineers who are responsible for the design of the memory PHY 140. Placing responsibility for the design of the memory PHY training algorithm in the hands of the memory PHY engineers may therefore lead to more efficient designs, which may further reduce the need for seeding of the training algorithm. Moreover, the training of multiple PHY instances must be serialized and BIOS qualification is tightly coupled to releases of new training code and lab characterizations of the seed information. Furthermore, before training the memory PHY 140 using a BIOS training algorithm, many blocks in the APU 100 may need to be configured and running to support the data pipeline between the BIOS 120 and the memory PHY 140, which may increase the time-to-market for each target platform.

Figure 2:
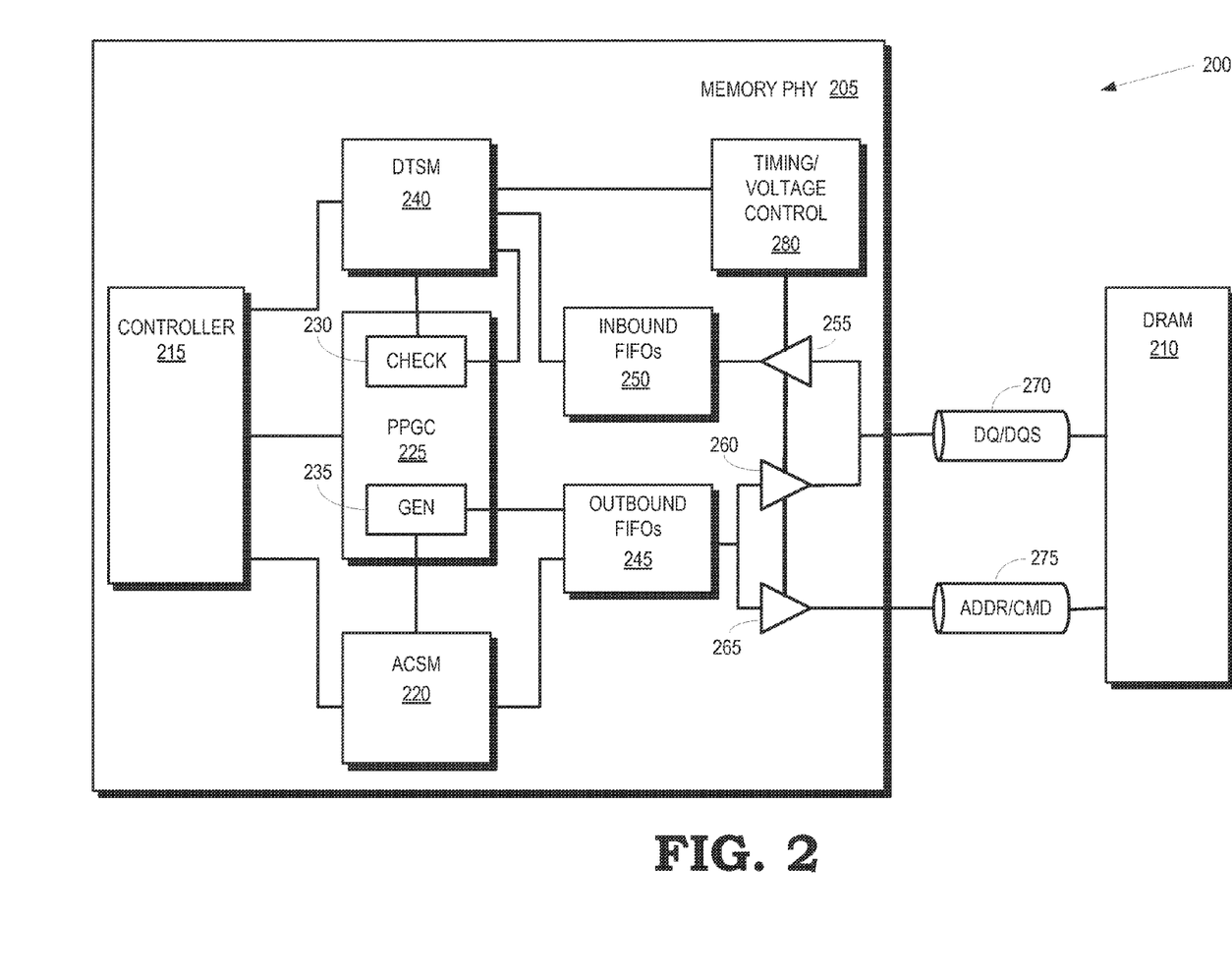
FIG. 2 is a block diagram of a portion of a processing unit that includes a memory PHY and a DRAM according to some embodiments.

FIG. 2 is a block diagram of a portion 200 of a processing unit that includes a memory PHY 205 and a DRAM 210 such as the memory PHY 140 and the DRAM 135 shown in FIG. 1 according to some embodiments. The memory PHY 205 includes a controller 215 that is used to control read training and write training of the memory PHY 205 for communication with the DRAM 210 based on a training algorithm. Some embodiments of the controller 215 may be implemented in hardware, firmware, software, or a combination thereof. The controller 215 may also be referred to as a microcontroller 215 in some embodiments. Since the controller 215 is integrated into the memory PHY 205 and is therefore not separated from the memory PHY 205 by a data pipeline, the training algorithm implemented by the controller 215 may be a seedless training algorithm. As discussed herein, a seedless training algorithm does not need to be configured using information that characterizes a signal path or data pipeline traversed by training sequences or commands generated by the training algorithm, e.g. for post-processing of the returned signals. The controller 215 may initiate training in response to power up, vertical retrace frequency changes, power state transitions (e.g., between idle and active states), periodically at a predetermined frequency, or in response to other events or signals.

The controller 215 may interact with a BIOS such as the BIOS 120 shown in FIG. 1. In some embodiments, the BIOS may configure the controller 215 by loading a memory array such as local static random access memory (SRAM), providing configuration information associated with the DRAM 210, or instructing the controller 215 to initiate a training sequence in response to the system booting up. However, once the controller 215 has been configured, some embodiments of the controller 215 control training of the memory PHY 205 substantially independently of the BIOS and substantially without input from the BIOS. For example, the controller 215 implements a training algorithm that operates independently of the BIOS and can train the memory PHY 205 without receiving training commands or training sequences from the BIOS. Since the controller 215 can control training of the memory PHY 205 without input from the BIOS, which would have to be transmitted from the BIOS to the controller 215 over a data pipeline, the training algorithm may be implemented as a seedless training algorithm.

The controller 215 is coupled to a first training engine 220, which also may be referred to as an address command state machine (ACSM) 220. The ACSM 220 generates commands that may be provided to the DRAM 210 during training of the memory PHY 205. The programmable commands may be generated "at speed" for embodiments of the first training engine 220 that are implemented in hardware as an integrated part of the memory PHY 205. The commands may be stored in registers (not shown) in a sequence that is determined by the controller 215. The commands may then be issued to the DRAM 210 in response to the controller 215 writing a start bit into a control register in the ACSM 220. Commands generated by the ACSM 220 may include read commands to read information from a specified location in the DRAM 210 and write commands to write information to a specified location in the DRAM 210. Some embodiments of the ACSM 220 may generate loopback commands that combine concurrent read and write commands that drive signals to the physical pins of the memory PHY 205, which are then returned along paths through the memory PHY 205. Loopback commands may therefore be used to test the memory PHY 205 without requiring that the DRAM 210 be connected to the physical pins of the memory PHY 205. Some embodiments of the ACSM 220 may generate looped commands that repetitively perform one or more commands with a specified delay between the commands, looping or repeating on a single instruction during execution, looping over multiple commands in a sequence, and the like.

The controller 215 is also coupled to a second training engine 225, which may be referred to as a PRBS pattern generator checker (PPGC) 225. Some embodiments of the PPGC 225 are programmable and can generate data streams that are used as the training sequences for training the memory PHY 205. For example, the PPGC 225 may generate a data stream for any 16-bit or less polynomial in response to signaling provided by the controller 215. Some embodiments of the PPGC 225 include a separate generator 235 that is used to generate the training sequence and a checker 230 that is used to check synchronization of the read or write streams that include the training sequences that flow between the memory PHY 205 and the DRAM 210. Operation of the PPGC 225 may be controlled by signaling received from the ACSM 220. For example, the ACSM 220 may provide signaling that sequences execution of operations such as generating the training sequences at the generator 230.

The controller 215 is also coupled to a third training engine, which may be referred to as a data training state machine (DTSM) 240. The DTSM 240 compares traffic received from the DRAM 210 to the training sequences provided to the DRAM 210 to determine whether to adjust timing parameters or voltage offset parameters used by the memory PHY 205. For example, the PPGC 225 may provide representations of the training sequences to the DTSM 240 for comparison to the sequences returned from the DRAM 210 during read training or write training of the memory PHY 205. Prior to starting a training loop, the controller 215 may configure the DTSM 240 to control timing parameters or voltage offset parameters used by the memory PHY 205. The controller 215 may then program the ACSM 220 and the PPGC 225 to drive one or more training sequences. The DTSM 240 may then compare the training sequences generated by the PPGC 225 to sequences that have been received from the DRAM 210. For example, the DTSM 240 may correlate the training sequences and the receive sequences at a plurality of different delays. Based on the comparison, the DTSM 240 decides whether to adjust the timing parameters or the voltage offset parameters, e.g., by incrementing or decrementing one or more of these parameters. For example, a timing offset may be increased or decreased based on the delay determined based on the correlation of the training sequences and the receive sequences. Some embodiments of the DTSM 240 may also implement data filters or binary adders with upper or lower threshold comparison logic to train to a data contour eye position.

Sets of first-in-first-out (FIFO) buffers may be used to buffer the training sequences before being provided to the DRAM 210 and to buffer received sequences after being received from the DRAM 210. For example, a set of outbound FIFO buffers 245 may be used to buffer the outbound traffic and a set of inbound FIFO buffers 250 may be used to buffer the inbound traffic. One or more receivers 255 may be used to receive signals over channels to the DRAM 210 and provide them to the inbound FIFO buffer 250. One or more drivers 260, 265 may be used to transmit signals from the outbound FIFO buffer 245 over the channels to the DRAM 210. For example, the driver 260 may be used to drive data (DQ) or timing (DQS) signals onto the channel 270 and the receiver 255 may receive data (DQ) or timing (DQS) signals over the channel 270. For another example, the driver 265 may be used to drive addresses (ADDR) or commands (CMD) over the channel 275 to the DRAM 210. Timing delays and voltage offsets used by the receivers 255 or the drivers 260, 265 may be adjusted.

The memory PHY 205 includes timing/voltage control logic 280. The DTSM 240 may provide signals to the timing/voltage control logic 280 to indicate adjustments to the timing parameters. For example, the DTSM 240 may instruct the timing/voltage control logic 280 to increment or decrement timing delays or voltage offsets based on comparisons of training sequences provided to the DRAM 210 and sequences received from the DRAM 210. The timing/voltage control logic 280 may then provide control signals to the receivers 255 or the drivers 260, 265 to adjust the timing delays or voltage offsets used by the receivers 255 or the drivers 260, 265. Some embodiments of the timing/voltage control logic 280 may be used to adjust timing delays or voltage offsets in multiple stages such as a receive enable stage, a write leveling stage, a read training stage, a write training stage, and a stage for determining voltage levels of a data eye contour for the interface between the memory PHY 205 and the DRAM 210.

Figure 3:
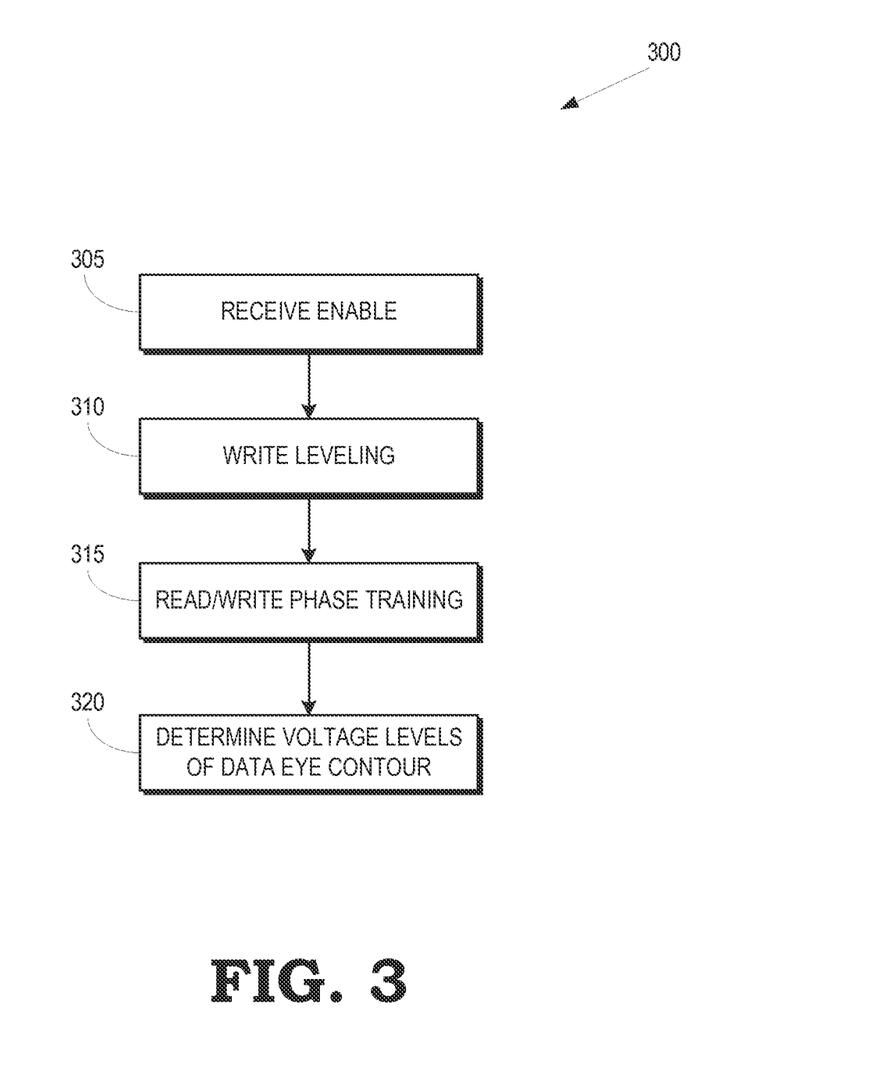
FIG. 3 is a flow diagram of a method of training a memory PHY that may be implemented in a processing unit, such as the accelerated processing unit shown in FIG. 1, according to some embodiments.

FIG. 3 is a flow diagram of a method 300 of training a memory PHY that may be implemented in a processing unit such as the accelerated processing unit 100 shown in FIG. 1 according to some embodiments. Embodiments of the method 300 may be implemented in training control logic such as the training control logic 155 shown in FIG. 1 or the controller 215, ACSM 220, PPGC 225, DTSM 240, and timing/voltage control logic 280 shown in FIG. 2.

At block 305, the training control logic performs receive enable training to determine when to enable the memory PHY to receive data over the interface with the DRAM. Some embodiments perform receive enable training by transmitting a read commands to read a selected address from the DRAM. The read commands are interspersed with a sequence of bubbles that generate corresponding sequences of bubbles in the signals received from the DRAM. The training control logic then monitors signals received from the DRAM to align the time of command generation in the memory PHY to the time the command response from the DRAM is returned to the memory PHY. The bubble spacing time interval range is sized so as to be greater than the worst case round trip latency plus any internal memory PHY and DRAM latencies in the path. This avoids any potential aliasing of the command response association with an earlier or later response. The memory PHY may be configured to stay in a continuous read state during the receive enable training stage. For example, the controller 215 may configure the ACSM 220, PPGC 225, and DTSM 240 and then initiate the training stage. The ACSM 220 may issue commands/addresses to write a training sequence to the DRAM 210 and then issue commands/addresses to read the training sequence back from the DRAM 210. In some embodiments, no information is actually written to the DRAM 210 in response to the issued commands and the DQ bus is ignored. Only the returned DQS is monitored. The issued command is therefore similar to a read command but the DTSM 240 does not care what data is returned in response to the command. The DTSM 240 is only interested in adjusting the timing of the DQS strobe that comes back from DRAM 210. The training sequence may be generated by the PPGC 225 and provided to the DRAM 210. The DTSM 240 may then correlate receive data from the DRAM 210 with the training sequence to identify the round-trip delay and instruct the timing/voltage control logic 280 to tune the parameters for the appropriate receivers/drivers such as the receivers 255 and the drivers 260, 265 to null the detected round trip delay.

At block 310, the training logic performs write leveling to align clock signals used by the memory PHY to clock signals used by the DRAM. Some embodiments of the training logic may therefore transmit a memory PHY clock signal and a timing (DQS) signal that is used to sample the value of the clock at the DRAM. The training logic may then use the sampled value of the DRAM clock returned on the DQ bus to align the memory PHY clock and the DRAM clock, e.g., by introducing delays to align the DQS signal with a memory clock phase that is internal to the DRAM. For example, in response to signaling from the controller 215, the ACSM 220 may generate a write command that causes a memory PHY clock signal including a rising edge and a DQS signal that is provided to the DRAM 210 to sample the memory clock in the DRAM. The sampled value of the DRAM clock may then be returned to the memory PHY 205. The checker 230 in the PPGC 225 generates an internal comparison value and provides this value to the DTSM 240. The DTSM 240 may then compare the internal comparison value to the sampled clock signal value received from the DRAM 210 and generate adjustment signals based on the comparison to align the write DQS to the clock in the DRAM 210. The DTSM 240 may then instruct the timing/voltage control logic 280 to tune the timing parameters for the receivers 255 and the drivers 260, 265 to synchronize the memory PHY clock and the DRAM clock. For example, if the internal comparison value is "0" and the sampled value of the DRAM clock is "1," the DTSM 240 may instruct the timing/voltage control logic 280 to advance the timing of the memory PHY 205 by a predetermined amount of time. If the internal comparison value is "1" and the sampled value of the DRAM clock is "1," the DTSM 240 may instruct the timing/voltage control logic 282 delay the timing of the memory PHY 205 by a predetermined amount of time. This process may be iterated to tune the synchronization of the memory PHY clock and the DRAM clock to within a predetermined tolerance.

At block 315, the training logic performs read/write phase training to determine the one-dimensional time boundaries of the data eye contour based on the read/write data paths between the memory PHY and the DRAM. Some embodiments of the training logic may therefore transmit a series of commands to write a training sequence into addresses in the DRAM and then loop-read the training sequences out of the addressed locations of the DRAM at different delays to determine the one-dimensional time boundaries of the data eye contour. For example, in response to signaling from the controller 215, the ACSM 220 may issue commands to write one or more sequences generated by the PPGC 225 to one or more addresses in the DRAM 210. The ACSM 220 may then issue a series of read commands to the addresses in the DRAM 210 that are looped with different delay values. The DTSM 240 may then compare the received sequences for each of the looped read commands to the provided training sequences to determine the left edge and the right edge of the data eye contour. The DTSM 240 may then instruct the timing/voltage control logic 280 to tune the timing parameters, e.g., the phase, for the receivers 255 to correspond to a predetermined location in the data eye contour such as the midpoint between the left edge and the right edge.

At block 320, the training logic performs two-dimensional (2D) read/write phase training to determine the voltage levels of the data eye contour based on the read/write data paths between the memory PHY and the DRAM. Some embodiments of the training logic may therefore transmit a series of read/write commands to read and write training sequences to and from the DRAM. The series of read/write commands may be performed using different timing delays and different voltage offsets to determine the voltage levels in the data eye contour. For example, in response to signaling from the controller 215, the ACSM 220 may issue commands to write one or more sequences generated by the PPGC 225 to one or more addresses in the DRAM 210 using an initial timing delay. The ACSM 220 may then issue a series of looped read commands to the addresses in the DRAM 210. The read/write commands may be issued concurrently with providing different values of the voltage offset to the receivers 255 or the drivers 260, 265. The DTSM 240 may then compare the received sequences for each of the looped read commands to the provided training sequences to determine the voltage levels between the left edge and the right edge of the data eye contour for the initial timing delay. The timing delay may be changed (e.g., incremented or decremented) and the process of determining the voltage levels may be repeated. This process may be iterated to determine the two-dimensional data eye contour over a range of timing delays and voltage levels. Some embodiments may instead iteratively choose voltage levels and loop over timing delays for the selected voltage level to determine the two-dimensional data eye contour.

The DTSM 240 instructs the timing/voltage control logic 280 to tune the timing delays and the voltage offsets for the receivers 255 or the drivers 260, 265 to correspond to a location in the data eye contour that provides the best voltage level and timing delay. Adjustments to the timing delays or the voltage offsets can be determined based on numbers of correct samples and incorrect samples in sampled training data. Some embodiments of the DTSM 240 may determine the optimal timing delay and voltage offset based on a predetermined ratio of correct samples to incorrect samples in sampled training data. For example, the DTSM 240 may tune the timing delay and the voltage offset until the ratio of the number of correct samples to the number of incorrect samples received by the memory PHY 205 is at or below the predetermined ratio. Some embodiments of the DTSM 240 may use the predetermined ratio to alter the shape of the data eye contour with the expectation that a better optimal training position could be determined. For example, the 2D eye contour could be expanded or contracted based on the predetermined ratio. Other alterations to the shape of the 2-D data eye contour are also possible.

Embodiments of the techniques described herein may have a number of advantages over conventional training algorithms that are implemented in a system BIOS and must be conveyed to the memory PHY over a data pipeline. Some embodiments of the integrated training logic may reduce the overall training time or allow increasingly complex training sequences to be implemented while maintaining a substantially constant training time. Integrating the training logic into the memory PHY allows the high-speed command/data generation and control to be located close to the memory PHY data pipes, which allows fine grained control of the training sequences, etc. Embodiments of the training logic may also enhance seedless training by forcing tighter coupling between firmware algorithm development and design of the hardware mechanisms. Training may also be performed in parallel for different memory PHY instances. The silicon system debug and hardware bring-up processes may be easier to implement when the training logic is integrated into the memory PHY.

The design process may also be improved when the training logic is integrated into the memory PHY. For example, training hardware and training algorithms for the memory PHY can be developed and tested in isolation from rest of SOC. System complexity and the details of the memory PHY behavior may be contained at the boundary between the memory PHY and other logic in the SOC. System configuration may also support a natural extension from RTL simulation into an integrated training algorithm development environment. Moreover, the training hardware for the memory PHY and the corresponding training algorithms can packaged as complete IP across multiple SOCs (including $3^{rd}$ party SOCs).

In some embodiments, the apparatus and techniques described above are implemented in a system comprising one or more integrated circuit (IC) devices (also referred to as integrated circuit packages or microchips), such as the memory PHY described above with reference to FIGS. 1-3. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 4:
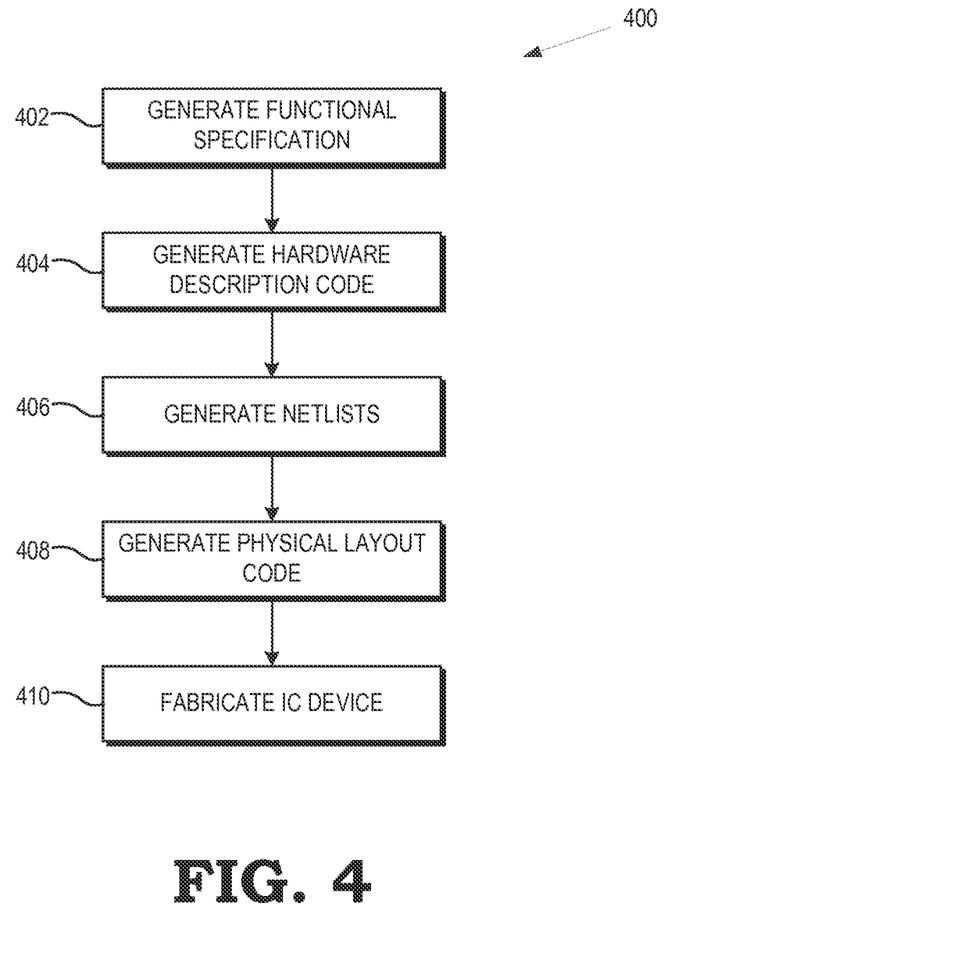
FIG. 4 is a flow diagram illustrating a method for designing and fabricating an integrated circuit device implementing at least a portion of a component of a processing system according to some embodiments.

FIG. 4 is a flow diagram illustrating an example method 400 for the design and fabrication of an IC device implementing one or more aspects according to some embodiments. As noted above, the code generated for each of the following processes is stored or otherwise embodied in non-transitory computer readable storage media for access and use by the corresponding design tool or fabrication tool.

At block 402 a functional specification for the IC device is generated. The functional specification (often referred to as a micro architecture specification (MAS)) may be represented by any of a variety of programming languages or modeling languages, including C, C++, SystemC, Simulink, or MATLAB.

At block 404, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 406 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 408, one or more EDA tools use the netlists produced at block 406 to generate code representing the memory physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements according to the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 410, the memory physical layout code (e.g., GDSII code) is provided to a manufacturing facility, which uses the memory physical layout code to configure or otherwise adapt fabrication tools of the manufacturing facility (e.g., through mask works) to fabricate the IC device. That is, the memory physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments.

However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a memory physical layer interface (PHY) to couple to an external memory, the memory PHY comprising a controller, wherein the controller is to control training of the memory PHY for communication with the external memory based on a training algorithm so as to converge on a solution for a timing delay and a voltage offset between the memory PHY and the external memory without receiving, from a basic input/output system (BIOS), seed information that characterizes a signal path traversed by training sequences or commands generated by the training algorithm.

2. The apparatus of claim 1, wherein the training algorithm is a seedless training algorithm.

3. An apparatus comprising:
a memory physical layer interface (PHY) to couple to an external memory, the memory PHY comprising a controller, wherein the controller is to control training of the memory PHY for communication with the external memory based on a training algorithm; and
a first training engine to generate at-speed programmable sequences of commands for delivery to the external memory in response to control signaling generated by the controller based on the training algorithm.

4. The apparatus of claim 3, further comprising:
a second training engine to generate training data sequences for delivery to the external memory in response to control signaling generated by the first training engine.

5. The apparatus of claim 4, further comprising:
a third training engine to compare sequences received from the external memory to the training sequences generated by the second training engine.

6. The apparatus of claim 5, wherein the first training engine sequences execution of tasks performed by at least one of the second training engine and the third training engine based on the training algorithm.

7. The apparatus of claim 5, wherein the third training engine adjusts at least one of a timing parameter and a voltage offset parameter used by the memory PHY for at least one of reading data from the external memory and writing data to the external memory.

8. The apparatus of claim 7, wherein the third training engine determines at least one of the timing parameter and the voltage offset parameter based on numbers of correct samples and incorrect samples in sampled training data.

9. The apparatus of claim 3, wherein the training algorithm is a seedless training algorithm.

10. A method comprising:
generating, at a controller that is included in a memory physical layer interface (PHY), control signaling for training of the memory PHY for communication with an external memory based on a training algorithm, wherein generating the control signaling comprises generating the control signaling so that the training algorithm converges on a solution for a timing delay and a voltage offset between the memory PHY and the external memory without receiving, from a basic input/output system (BIOS), seed information that characterizes a signal path traversed by training sequences or commands generated by the training algorithm.

11. The method of claim 10, wherein generating the control signaling comprises generating the control signaling based on a seedless training algorithm.

12. A method comprising:
generating, at a controller that is included in a memory physical layer interface (PHY), control signaling for training of the memory PHY for communication with an external memory based on a training algorithm; and
providing first control signaling from the controller to a first training engine, wherein the first training engine is to generate sequences of at-speed commands for delivery to the external memory in response to the first control signaling.

13. The method of claim 12, further comprising:
providing second control signaling from the first training engine to a second training engine, wherein the second training engine is to generate training sequences for delivery to the external memory in response to the second control signaling from the first training engine.

14. The method of claim 13, further comprising:
providing third control signaling from the first training engine to a third training engine, wherein the third training engine is to compare sequences received from the external memory to the training sequences generated by the second training engine in response to the third control signaling.

15. The method of claim 14, further comprising:
sequencing execution of tasks performed by at least one of the second training engine and the third training engine based on signals provided to said at least one of the second training engine and the third training engine by the first training engine.

16. The method of claim 14, further comprising:
determining, at the third training engine, at least one of a timing delay and a voltage offset used by the memory PHY for at least one of reading data from the external memory and writing data to the external memory.

17. The method of claim 16, wherein determining said at least one of the timing delay and the voltage offset comprises determining said at least one of the timing delay and the voltage offset based on a predetermined ratio of correct samples to incorrect samples in sampled training data.

18. The method of claim 12, wherein generating the control signaling comprises generating the control signaling based on a seedless training algorithm.

19. A non-transitory computer readable medium embodying a set of executable instructions, the set of executable instructions to manipulate at least one processor to:
   generate control signaling for training of the memory physical layer interface (PHY) for communication with an external memory based on a training algorithm, wherein the memory PHY includes said at least one processor, wherein said at least one processor is to generate the control signaling based on a seedless training algorithm so that the seedless training algorithm converges on a solution for a timing delay and a voltage offset between the memory PHY and the external memory without receiving, from a basic input/output system (BIOS), seed information that characterizes a signal path traversed by training sequences or commands generated by the training algorithm.

* * * * *